US012421767B2

(12) United States Patent
Basavarajappa

(10) Patent No.: US 12,421,767 B2
(45) Date of Patent: Sep. 23, 2025

(54) MOTOR VEHICLE LOCK, IN PARTICULAR MOTOR VEHICLE DOOR LOCK

(71) Applicant: KIEKERT AKTIENGESELLSCHAFT, Heiligenhaus (DE)

(72) Inventor: Madhu S. Basavarajappa, Leverkusen (DE)

(73) Assignee: Kiekert AG, Heiligenhaus (DE)

( * ) Notice: Subject to any disclaimer, the term of this patent is extended or adjusted under 35 U.S.C. 154(b) by 370 days.

(21) Appl. No.: 18/254,891

(22) PCT Filed: Dec. 13, 2021

(86) PCT No.: PCT/DE2021/000199
§ 371 (c)(1),
(2) Date: Jun. 13, 2023

(87) PCT Pub. No.: WO2022/127958
PCT Pub. Date: Jun. 23, 2022

(65) Prior Publication Data

US 2024/0060335 A1 Feb. 22, 2024

(30) Foreign Application Priority Data

Dec. 14, 2020 (DE) ..................... 10 2020 133 259.9

(51) Int. Cl.
*E05B 77/12* (2014.01)
*E05B 77/06* (2014.01)

(52) U.S. Cl.
CPC .............. *E05B 77/12* (2013.01); *E05B 77/06* (2013.01)

(58) Field of Classification Search
CPC .......... E05B 77/12; E05B 77/06; E05B 77/02; E05B 77/30
See application file for complete search history.

(56) References Cited

U.S. PATENT DOCUMENTS 11,072,947 B2 7/2021 Reddmann
11,280,121 B2 * 3/2022 Sardelli ................. E05B 15/004
(Continued)

FOREIGN PATENT DOCUMENTS

CN 116065902 A * 5/2023 ............. E05B 77/12
CN 118745848 A * 10/2024 ............. E05B 77/02
(Continued)

OTHER PUBLICATIONS

International Search Report mailed Apr. 20, 2022, for priority International Application No. PCT/DE2021/000199.

*Primary Examiner* — Christine M Mills
*Assistant Examiner* — Faria F Ahmad
(74) *Attorney, Agent, or Firm* — Renner, Otto, Boisselle & Sklar, LLP

(57) ABSTRACT

A motor vehicle lock, in particular a motor vehicle door lock. Said motor vehicle door lock essentially has a locking mechanism consisting of a rotary latch and a pawl. Furthermore, at least one actuating lever and a release lever are realized which can be brought into engagement via a coupling element, in its coupled position, and can be brought out of engagement, in its uncoupled position. Finally, a mass inertia lever for urging the coupling element into its uncoupled position at least in a crash situation is also provided. According to the invention, the actuating lever has to undergo a 2-stroke actuation in order to open the locking mechanism during or after a crash situation.

12 Claims, 6 Drawing Sheets

(56) References Cited

U.S. PATENT DOCUMENTS

| | | | | |
|---|---|---|---|---|
| 2003/0116977 | A1* | 6/2003 | Erices | E05B 81/14<br>292/201 |
| 2019/0271180 | A1* | 9/2019 | Sardelli | E05B 81/14 |

FOREIGN PATENT DOCUMENTS

| | | | | |
|---|---|---|---|---|
| DE | 102012003743 | A1 | 8/2013 | |
| DE | 202015100809 | U1 | 5/2016 | |
| DE | 102024104645 | A1 * | 8/2024 | E05B 77/12 |
| EP | 3371398 | B1 | 7/2019 | |
| GB | 2073299 | B | 9/1983 | |
| WO | WO-2022167031 | A1 * | 8/2022 | E05B 77/06 |

* cited by examiner

MOTOR VEHICLE LOCK, IN PARTICULAR MOTOR VEHICLE DOOR LOCK

This application is a national phase of International Patent Application No. PCT/DE2021/000199 filed Dec. 13, 2021, which claims priority to German Patent Application No. 10 2020 133 259.9 filed Dec. 14, 2020, each of which is hereby incorporated herein by reference in its entirety.

FIELD OF DISCLOSURE

The invention relates to a motor vehicle lock, in particular a motor vehicle door lock, comprising a locking mechanism consisting essentially of the rotary latch and pawl, further comprising at least one actuating lever and a release lever, which can be brought into engagement via a coupling element in its engaged position and out of engagement in its disengaged position, and with at least one mass inertia lever for forcing the coupling element into its disengaged position at least in the event of a crash.

BACKGROUND OF DISCLOSURE

As usual, when the coupling element is engaged, the actuating lever can act on the release lever so that it generally lifts the pawl away from its engagement with the rotary latch when the locking mechanism is closed. This can be done directly via the release lever or indirectly via other elements or levers that may be interposed. However, when the coupling element is in its disengaged position, an actuating lever chain is interrupted between the actuating lever and the release lever. As a result, swiveling movements of the actuating lever are idle compared to the release lever. Consequently, the locking mechanism in the closed state remains in the closed functional position and the pawl cannot be lifted from its engagement with the rotary latch. In order to transfer the coupling element to its engaged and disengaged position, a locking lever is usually provided. For example, this basic functionality is described in GB 2 073 299 B.

The generic prior art according to EP 3 371 398 B1 additionally provides a mass inertia lever at this point, with the help of which, for example, in the event of an accident or crash of the associated motor vehicle, an actuation of the actuating lever initiated by this is idle. In this case, the mass inertia lever ensures that the coupling element is actuated, at least in the event of a crash, so that the coupling element assumes its “disengaged” position. This prevents unintentional opening of the associated motor vehicle lock and in particular the motor vehicle door lock.

The assumption of the “disengaged” position of the coupling element and the consistently maintained closed position of the locking mechanism for the motor vehicle lock or motor vehicle door lock in the event of a crash is of particular importance so that occupants inside the motor vehicle are optimally protected. This is because, in the event of an accident or crash and the associated accelerations or lateral accelerations of usually 5 g and more, it is important that the associated motor vehicle lock, in particular the motor vehicle door lock, retains its closed position under any circumstances. Only then can associated safety systems, such as side impact protection or side airbags, which are usually located in the vehicle door, be effective. In fact, in the crash situation described, the mass inertia lever in question is usually deflected and thereby transfers the coupling element from its engaged position to the disengaged position or holds it in the disengaged position if the coupling element has already assumed said position. As a result, even an accidental deflection of the actuating lever does not cause the release lever to lift the pawl away from its engagement with the rotary latch. The locking mechanism remains closed as desired.

The prior art according to EP 3 371 398 B1 has basically proven itself, but still offers room for improvement. Thus, the crash situation is described with all its details. However, the actuation of the motor vehicle lock, and in particular the motor vehicle door lock after the crash, is addressed only rudimentarily. In fact, the known teaching assumes that the associated motor vehicle lock can be opened easily, at least from the outside. Whether opening from the inside is also possible remains open. Furthermore, the design is such that the motor vehicle lock ideally cancels the disengaged position of the coupling element caused by the mass inertia lever after the crash and the coupling element changes to the engaged position.

This can be problematic, for example, if the actuating lever is unintentionally impacted even after the crash situation, be it due to a crash-related deformation or be it due to environmental influences, such as trees, branches, a slope, etc. This means that the return of the coupling element to the engaged position after the crash can, under certain circumstances, lead to the associated motor vehicle door being opened unintentionally, which can be problematic for any injured occupants. Furthermore, it remains open whether opening from the inside will also be possible by uninjured occupants. The invention as a whole seeks to remedy this.

SUMMARY OF DISCLOSURE

The invention is based on the technical problem of further developing this type of motor vehicle lock, and in particular a motor vehicle door lock, in such a way that opening is possible both from the inside and from the outside, and unintentional opening of the motor vehicle door following the crash is avoided.

To solve this technical problem, a generic motor vehicle lock, and in particular a motor vehicle door lock within the scope of the invention, is characterized in that the actuating lever for opening the locking mechanism must be subjected to a 2-stroke actuation during or after the crash.

Advantageously, the actuating lever works on a spring acting on the mass inertia lever in the first stroke of its 2-stroke actuation. In the second stroke, the actuating lever then acts on the release lever engaged via the coupling element.

Within the scope of the invention, the action proceeds in such a way that the mass inertia lever first of all transfers the coupling element from its engaged position to the disengaged position or holds it in the disengaged position in the event of a crash—which is comparable to the generic prior art according to EP 3 371 398 B1—if the coupling element has assumed this disengaged position prior to the crash. As a result, the actuating lever can be swiveled without any problems in the event of a crash, and without its swiveling movement being transferred to the release lever and thus the locking mechanism via the then disengaged coupling element. Instead, the swiveling movements of the actuating lever are idle as desired.

In the context of the invention, the coupling element is also transferred from the disengaged position to the engaged position after the crash. The prerequisite for this, however, is the 2-stroke actuation on the actuating lever. However, according to the invention, this requires the actuating lever to work on the spring acting on the mass inertia lever in the first stroke. As a result, the spring ensures that after this first stroke of the actuating lever—and only then— the mass inertia lever no longer holds the coupling element in its disengaged position, but instead releases it so that the coupling element moves into the engaged position, for example with spring assistance. In principle, however, the mass inertia lever can also actively transfer the coupling element from the disengaged position to the engaged position after the first stroke or during the first stroke and after the actuating lever has acted on the spring acting on the mass inertia lever.

In any case, the coupling element has (re)assumed its engaged position after the first stroke of the actuating lever. As a result, the actuating lever can now work in its second stroke on the release lever engaged via the coupling element. This makes it possible to open the locking mechanism as desired within the scope of this second stroke. In contrast, the first stroke of the actuating lever corresponds to the spring attached to the mass inertia lever being impacted. During this process, the spring is transferred to a position which ensures that the mass inertia lever, with the help of the spring, leaves and indeed can leave its previously assumed position that disengages the coupling element. Only at the end of this process does the coupling element assume its engaged position.

This allows the actuating lever to act on the engaged coupling element in the second stroke, which is then mechanically connected to the release lever, so that the release lever in turn opens the locking mechanism as desired.

As a consequence of this, according to the invention, unintentional actuation of the actuating lever leading directly to a door opening, for example, is prevented, in particular after the crash situation, if the mass inertia lever has already re-engaged the coupling element after the crash situation, as in the prior art. Indeed, according to the invention, this process is preceded, as it were, by the first stroke of the actuating lever, which first transfers the spring acting on the mass inertia lever into a position that enables the spring to act on the mass inertia lever in such a way that it releases the coupling element or no longer holds it in its disengaged position. In principle, the described procedure naturally relates to unintentional opening of the locking mechanism due to the actuating lever swiveling not only after the crash situation, but also during the crash situation.

However, it is decisive that after the crash and with the coupling element mostly in the engaged position, unintentional door opening due to the actuating lever swiveling is avoided according to the invention and in contrast to the prior art. This is possible, for example, if the motor vehicle is in a tilted position after the crash or also if, after the crash, a branch or another component, for example, reaches under the actuating lever or an external handle and would thus lead to unintentional opening of the associated motor vehicle door in the event of a crash without the measures of the invention. Such unintentional opening after the crash is effectively prevented by the 2-stroke actuation of the actuating lever for opening the locking mechanism after the crash, which is implemented and required according to the invention. Herein lie the essential advantages.

According to an advantageous embodiment, the spring attached to the mass inertia lever engages with a contact tongue in a guide opening on the mass inertia lever. In this case, the contact tongue in question can essentially assume two positions within the guide opening. One position of the contact tongue may belong to the rest position, i.e. the position that the contact tongue assumes during normal operation of the motor vehicle lock. In addition, a crash position deviating herefrom is also realized, which the contact tongue assumes in the event of a crash. In the course of the 2-stroke actuation, the actuating lever now ensures in the first stroke that the contact tongue is transferred from its crash position inside the guide opening, which it assumed in the event of a crash, back to its rest position. In this rest position, the contact tongue or the spring acting on the mass inertia lever can then ensure that the mass inertia lever is swiveled in such a way that it releases the coupling element previously held in its disengaged position. The coupling element can then assume its engaged position, for example, with spring assistance. In principle, it is also possible for the mass inertia lever, together with the spring and the contact tongue in the rest position inside the guide opening, to actively ensure that the coupling element is transferred to the engaged position. The second stroke of the actuating lever then ensures the desired opening of the locking mechanism. This is because the coupling element is now engaged and, consequently, the actuating lever can work via the coupling element on the release lever which is thus engaged. The associated actuating lever chain is mechanically closed.

According to a further advantageous embodiment, not just one actuating lever is realized, but a main actuating lever as well as an inner actuating lever and/or an outer actuating lever can be provided. In most cases, the design is even such that, in addition to the main actuating lever, both an inner actuating lever and an outer actuating lever are realized. This provides the option for the motor vehicle lock according to the invention or its locking mechanism to be opened following the crash by a 2-stroke actuation on both the inner actuating lever and the outer actuating lever.

The levers, i.e. the main actuating lever, the inner actuating lever and also the outer actuating lever, are usually mounted on the same axis. The main actuating lever is usually designed as a two-arm lever. In fact, the main actuating lever usually has an inertia arm and an actuating arm. The inertia arm of the main actuating lever thereby mostly interacts with the mass inertia lever and here specifically with the spring attached to the mass inertia lever. In contrast, the actuating arm is usually set up to interact with the inner actuating lever. This means that the inner actuating lever can act on the actuating arm of the main actuating lever when it is actuated.

For the interaction of the inertia arm on the main actuating lever with the spring on the mass inertia lever, the inertia arm is usually equipped with a guide contour for the contact tongue on the spring. With the help of the guide contour, the contact tongue can be transferred during the first stroke of the actuating lever or main actuating lever from the crash position assumed in the event of a crash to the rest position within the guide opening, as explained previously.

Finally, the outer actuating lever advantageously has a stop for interaction with a counter stop on the main actuating lever. Thus, actuation of the outer actuating lever ensures that the main actuating lever is swiveled in order to then, in turn, transfer the contact tongue on the spring attached to the mass inertia lever from the crash position to the rest position, as described, during the first stroke of the actuating lever or outer actuating lever.

As a result, a motor vehicle lock is provided, which is further improved in terms of safety compared to the prior art. This is because unintentional door openings, especially after a crash, are reliably avoided. This is ensured by the 2-stroke actuation of the actuating lever implemented according to the invention for opening the locking mechanism after the crash or during the crash. In the first stroke of the actuating lever or main actuating lever, the mass inertia lever holding the coupling element in the disengaged position is transferred to a position that releases the coupling element. For this purpose, the actuating lever or main actuating lever works on the spring acting on the mass inertia lever in the first stroke. The second stroke of the actuating lever or main actuating lever then ensures that the release lever engaged via the coupling element can be acted upon to disengage the pawl from its engagement with the rotary latch and open the locking mechanism as desired. Herein lie the essential advantages.

BRIEF DESCRIPTION OF DRAWINGS

The invention is explained in greater detail below with reference to a drawing which shows only one exemplary embodiment. In the drawing.

DETAILED DESCRIPTION

Figure 1:
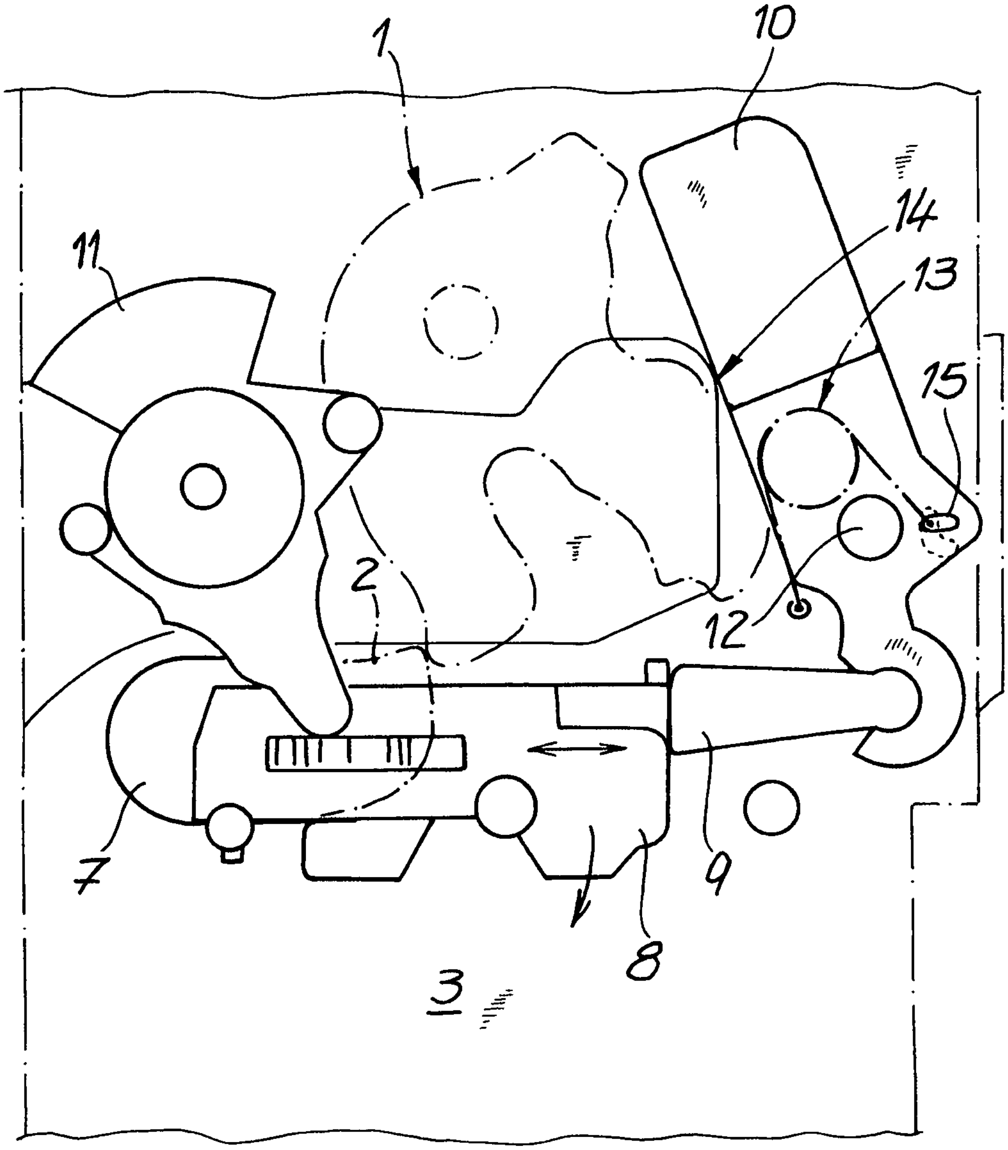
FIG. 1 shows the motor vehicle lock according to the invention in its normal position.

In the drawings, a motor vehicle lock is shown, which is a motor vehicle door lock. Said lock has a locking mechanism 1, 2, which is only indicated in FIG. 1, consisting essentially of a rotary latch 1 and a pawl 2. The rotary latch 1 as well as the pawl 2 are each mounted in a steel lock case 3.

The basic construction also includes an actuating lever 4, 5, 6. In fact, a main actuating lever 4, an outer actuating lever 5 and finally an inner actuating lever 6 are realized at this point. Furthermore, a release lever 7 and a coupling element 8 are provided. An mass inertia lever 9, 10 is also present.

The coupling element 8 can be displaced in its longitudinal direction to assume an engaged and a disengaged position and is mounted linearly displaceable on the release lever 7 for this purpose. The engaged position belongs to the normal state shown in FIG. 1. In this engaged position of the coupling element 8, the outer actuating lever 5 can interact with the coupling element 8, which in turn acts on the release lever 7 or "drives" it by means of the equiaxed bearing. This interaction corresponds to the fact that the coupling element 8, starting from the normal state in FIG. 1, is swiveled in the clockwise direction indicated there. In this case, the actuating lever chain closed in this context and consisting of the actuating lever 4, 5, 6, the engaged coupling element 8 and the release lever 7, which is also engaged with respect to the coupling element 8, can lift the pawl 2 from its engagement with the rotary latch 1 and open the closed locking mechanism 1, 2 when subjected to the action indicated there.

Figure 2:
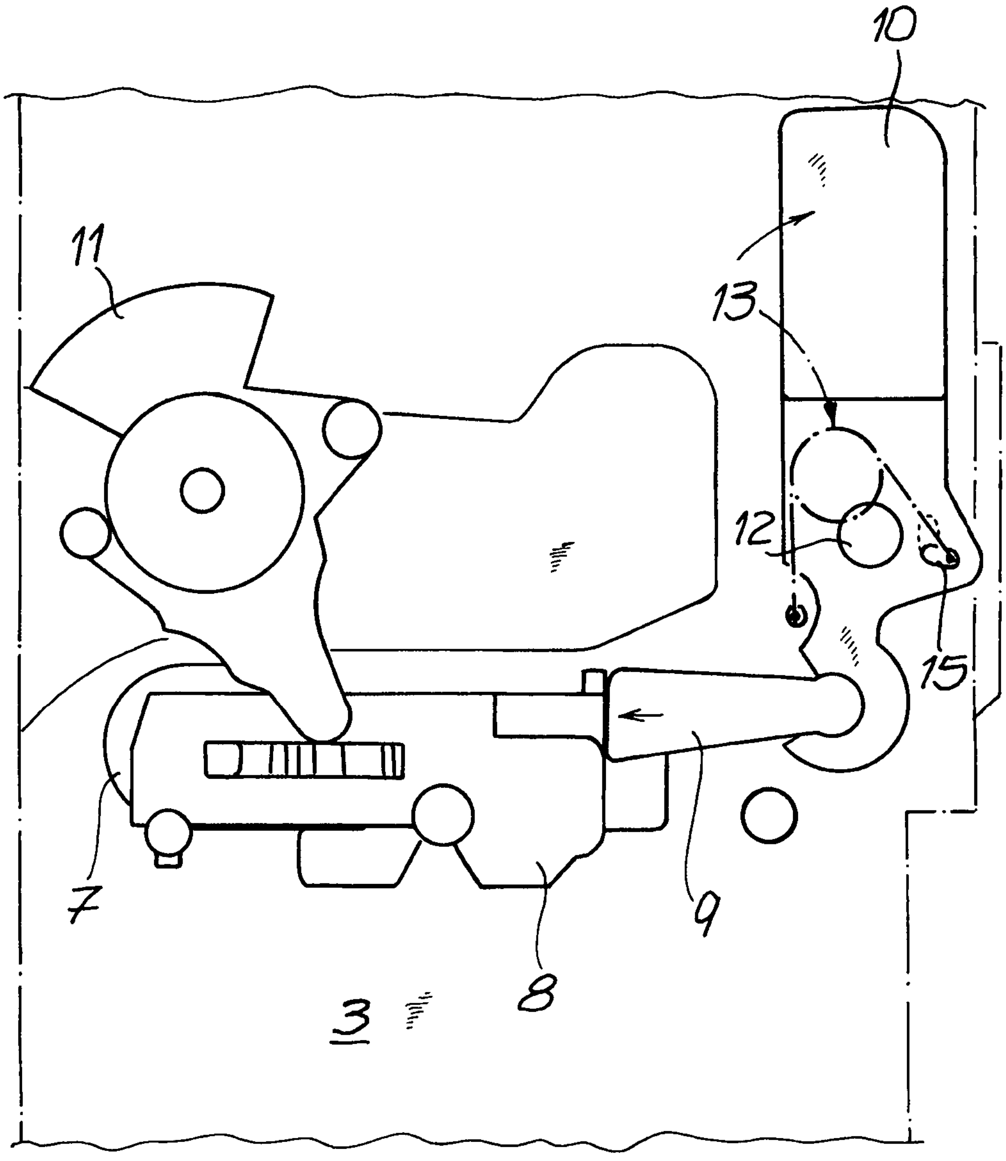
FIG. 2 is a reduced representation of the motor vehicle lock according to FIG. 1 in the event of a crash.

If, on the other hand, the coupling element 8 is in its disengaged position shown in FIG. 2, the actuating lever 4, 5, 6 cannot work on the coupling element 8 and consequently cannot open the locking mechanism 1, 2. A movement of the actuating lever 4, 5, 6 is consequently idle at this point.

The transition of the coupling element 8 from its engaged position according to FIG. 1 to the disengaged position according to the illustration in FIG. 2 is effected according to the embodiment example with the aid of the mass inertia lever 9, 10. In principle, the coupling element 8 can also be transferred to the engaged position and disengaged position with the aid of a locking element or locking lever 11, independently of the mass inertia lever 9, 10. However, according to the embodiment example and in the event of a crash, the mass inertia lever 9, 10 ensures this.

For this purpose, the mass inertia lever 9, 10 is designed in two parts in total and has a mass element 10 and a control element 9 which is articulated to it. The mass element 10 is mounted in the lock case 3 so that it can rotate around an axis 12. In addition, a spring 13, to be described below, is attached to the mass inertia lever 9, 10.

In the normal state shown in FIG. 1, the mass inertia lever 9, 10 rests with its mass element 10 against a stop 14 of a lock housing and the coupling element 8 is not acted upon by the actuating element 9. However, if a crash occurs, as can be observed in the transition from FIG. 1 to FIG. 2 and the associated lateral accelerations, the mass element 10 is swiveled clockwise around its axis 12 in the transition from FIG. 1 to FIG. 2. As a result, the actuating element 9, which is hinged to the mass element 10, moves against the coupling element 8 and transfers the latter from its engaged position shown in FIG. 1 to the disengaged position shown in FIG. 2. As a result, any movements of the actuating lever 4, 5, 6 with respect to the coupling element 8 are idle and, consequently, the coupling element 8 and thus the release lever 7 cannot be acted upon. The locking mechanism 1, 2 in the closed position remains closed.

Figure 3A:
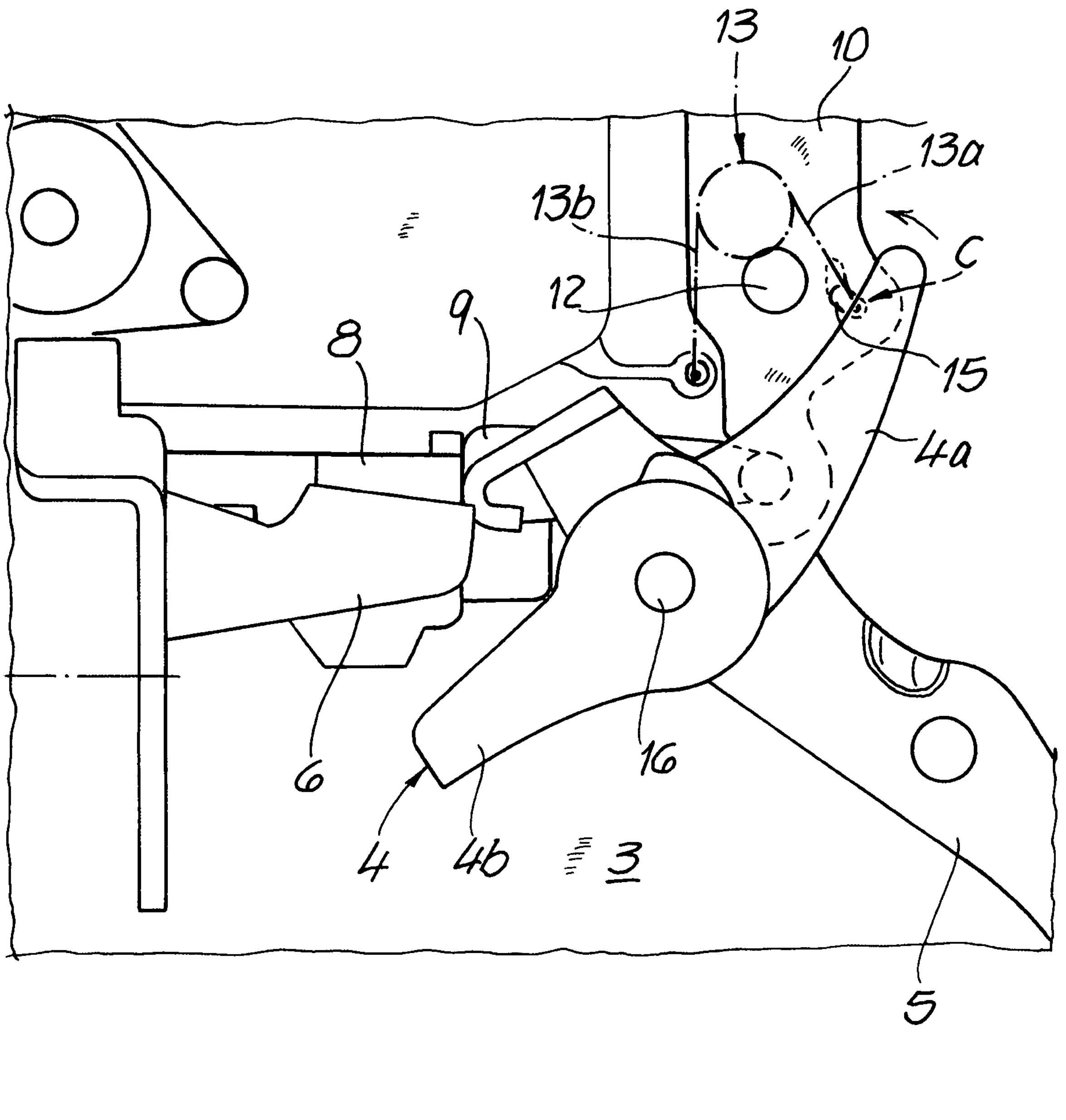
FIGS. 3A and 3B show the first and second strokes of the actuating lever.
Figure 3B:
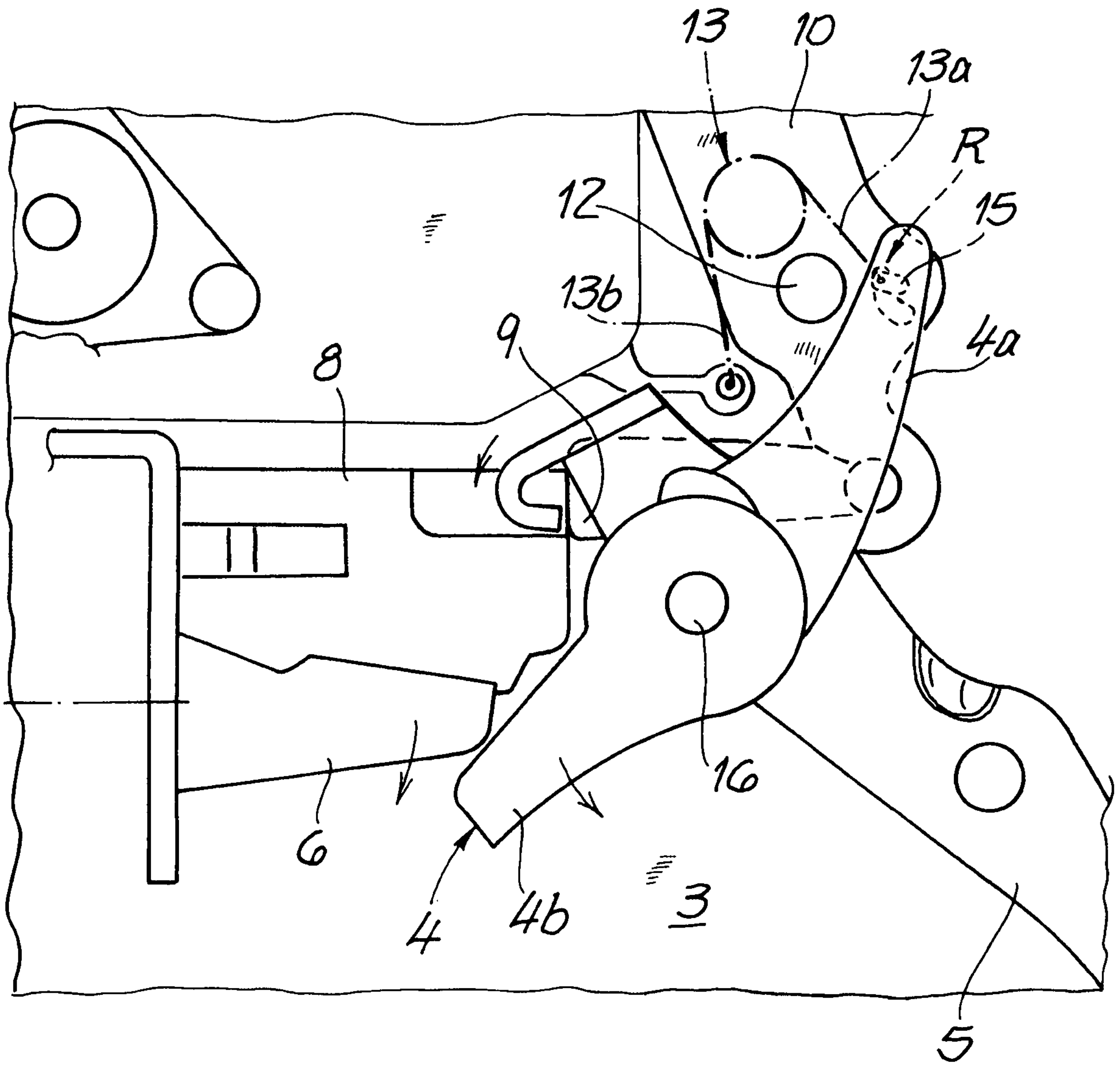

With the aid of FIGS. 3A and 3B, it is now possible to understand the impact of the motor vehicle lock according to the invention after the crash case essentially shown in FIG. 2. In fact, after the crash, the actuating lever 4, 5, 6 must be subjected to a 2-stroke actuation in order to open the locking mechanism 1, 2, which becomes clear on the basis of FIGS. 3A and 3B. In fact, in the first stroke, the actuating lever 4, 5, 6 ensures that the spring 13 interacting with the mass inertia lever 9, 10 is actuated. Here, in the crash position assumed in FIG. 3A or the position of the mass inertia lever 9, 10 deflected by the crash, when the actuating lever 4, 5, 6 is acted upon in the first stroke, the actuating lever 4, 5, 6 works on the spring 13 in question during the transition from FIG. 3A to FIG. 3B.

Specifically, it can be seen in FIG. 3A that, in the event of a crash or during the crash, the spring 13 engages with its one contact tongue 13*a* in a guide opening 15 of the mass inertia lever 9, 10 or the mass element 10. In fact, the contact tongue 13*a* on the spring 13 in question is then inside the guide opening 15 in its crash position C, which can be understood from the enlarged illustration in FIG. 4. As a result, the contact tongue 13*a* also ensures that the main actuating lever 4 rests against the contact tongue 13*a* in question in the event of a crash. Any movements of the actuating lever 4, 5, 6 in relation to the locking mechanism 1, 2 will therefore be idle, because the coupling element 8 has assumed its disengaged position in the illustration shown in FIG. 3A. This is ensured by the actuating element 9 in conjunction with the mass element 10 as components of the mass inertia lever 9, 10.

After the end of the crash situation and during the transition from FIG. 3A to FIG. 3B, the mass inertia lever 9, 10 predominantly returns to its normal position already shown in FIG. 1. This corresponds to a swiveling movement of the mass element 10 around its axis 12 starting from the position in FIG. 3A in a counterclockwise direction in the event of a crash. The position of the mass inertia lever 9, 10 in FIG. 3B corresponds to this.

The actuation of the actuating lever 4, 5, 6 in the functional position according to FIG. 3B now corresponds to the main actuating lever 4 also acting on the contact tongue 13*a* on the spring 13. In fact, this transfers the contact tongue 13*a* from its previously assumed crash position C inside the guide opening 15 in the mass element 10 to its rest position R.

The assumption of the rest position R on the part of the contact tongue 13*a* of the spring 13 has the effect that the spring 13 actuates the mass inertia lever 9, 10 in such a way that at or at the end of the first stroke of the actuating lever 4, 5, 6, the actuating element 9 leaves the coupling element 8. This allows the (spring-assisted) coupling element 8 to change from its disengaged position, assumed before and during the crash, to the engaged position, corresponding to the normal state as shown in FIG. 1. As a result, during the second stroke, the actuating lever 4, 5, 6 can work with its outer actuating lever 5 on the coupling element 8, starting from the illustration in FIG. 3B, and consequently, during the second stroke, the actuating lever 4, 5, 6 can and indeed does work on the release lever 7, which is then engaged via the coupling element 8. As a result, within the scope of this second stroke of the actuating lever 4, 5, 6, the locking mechanism 1, 2 is opened as desired by lifting the pawl 2 from its engagement with the rotary latch 1 via the release lever 7.

The detailed movement and interaction of the main actuating lever 4 in conjunction with the outer actuating lever 5 and the inner actuating lever 6 is explained in more detail below. In fact, the levers 4, 5, 6 in question are mounted on the same axis, namely they have a matching axis 16. In addition, the main actuating lever 4 is designed as a two-arm lever. In fact, an inertia arm 4*a* is realized at this point, which interacts with the contact tongue 13*a* or the spring 13 for the mass inertia lever 9, 10 as described. Furthermore, an actuating arm 4*b* is realized as part of the main actuating lever 5.

Figure 4:
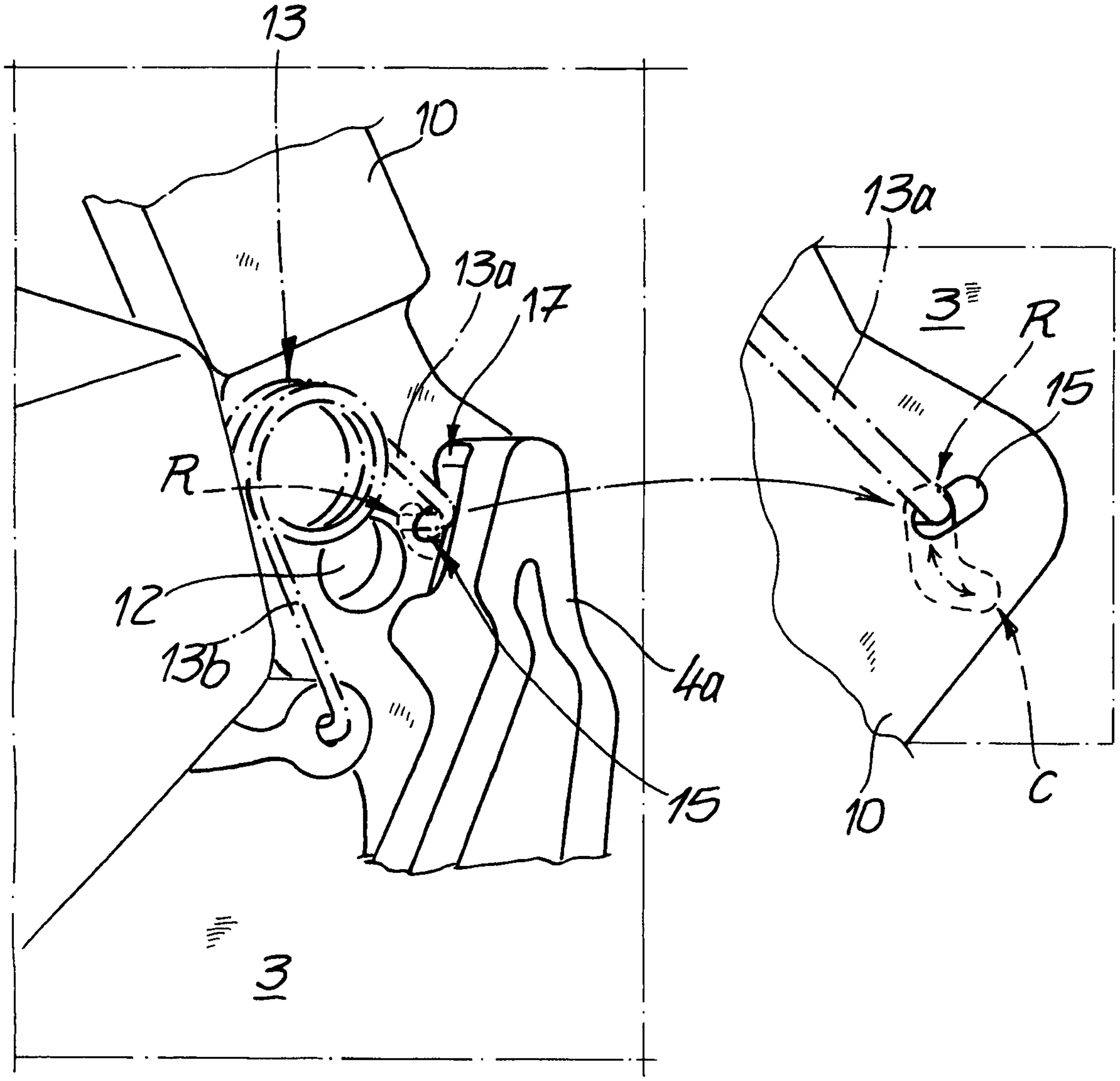
FIG. 4 is a perspective section from FIGS. 3A and 3B looking at the main actuating lever.
Figure 5:
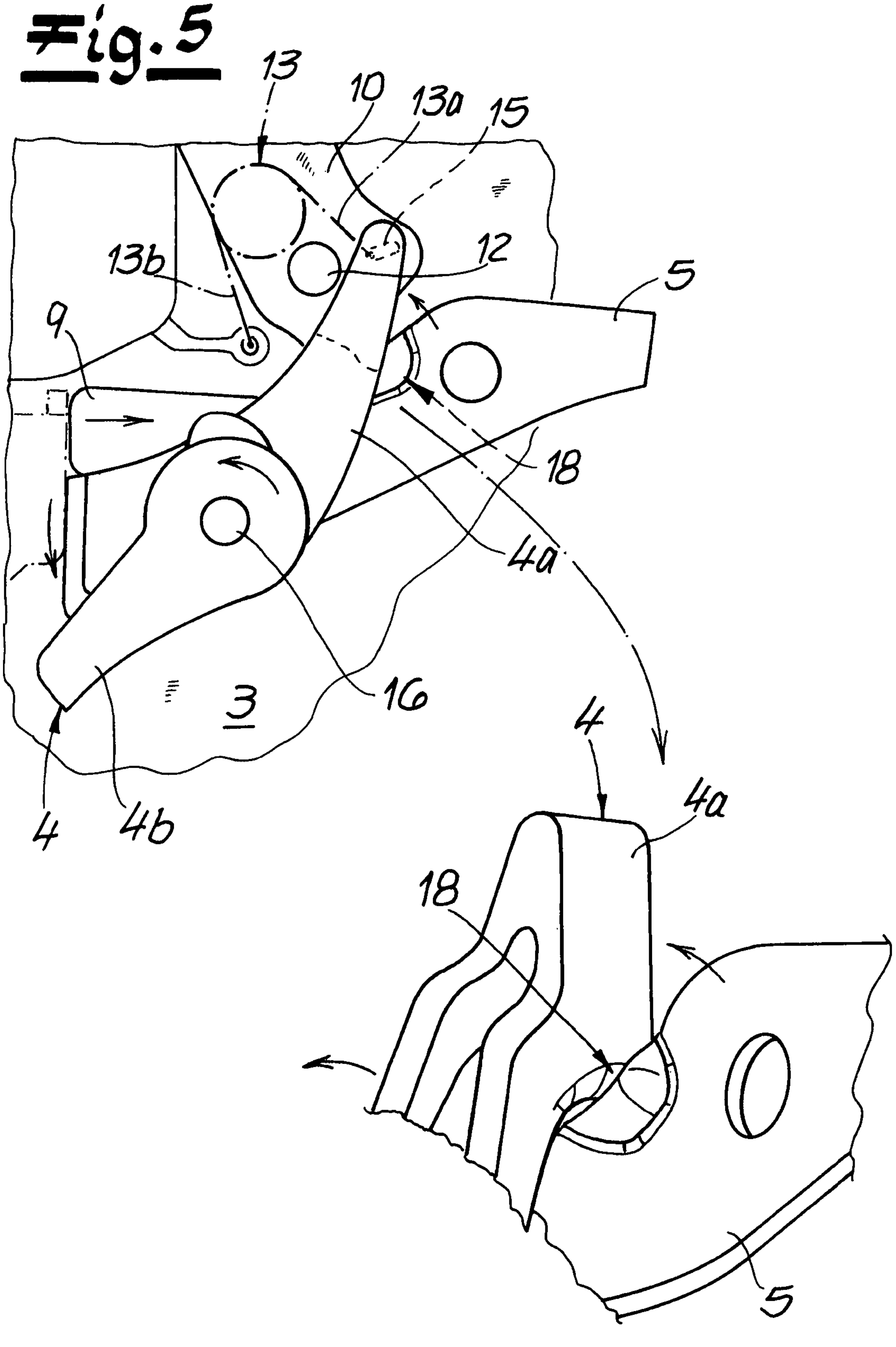
FIG. 5 shows a detail from FIG. 4.

The inertia arm 4*a* and thus the main actuating lever 4 has an overall guide contour 17, which can best be seen in the perspective view according to FIG. 4. With the aid of this guide contour 17, the contact tongue 13*a* is moved during the first stroke of the actuating lever 4, 5, 6 and during the transition from FIG. 3A to FIG. 3B from its previously assumed crash position C within the guide opening 15 in the mass inertia lever 9, 10 to the rest position R. In addition, a stop 18 is implemented on the outer actuating lever 5, which can also best be seen and understood in FIG. 4. The stop 18 on the outer actuating lever 5 interacts with a counter stop on the main actuating lever 4.

FIG. 3A shows the end of the crash situation and the first stroke of the actuating lever 4, 5, 6. In fact, the first stroke of the actuating lever 4, 5, 6 corresponds to the outer actuating lever 5 swiveling counterclockwise around the common axis 16, as indicated in FIG. 3A. The counterclockwise movement of the outer actuating lever 5 now has the effect that the outer actuating lever 5 moves with its stop 18 against the main actuating lever 4. As a result, the main actuating lever 4 with its contour 17 ensures that the contact tongue 13*a* of the spring 13 received within the contour 17 is transferred from the crash position C to the rest position R. A comparable stroke can also be produced by means of the inner actuating lever 6, in that the latter works on the actuating arm 4*b* of the main actuating lever 4 and also ensures that the main actuating lever 4 as a whole performs a counterclockwise movement around the common axis 16 in the illustration shown in FIG. 3B.

Since the spring 13 is guided with one contact tongue 13*a* within the guide opening 15 of the mass element 10 or the mass inertia lever 9, 10, whereas the other tongue 13*b* of the spring 13, which is designed as a leg spring, is anchored in a fixed position in the lock housing or in the lock case 3, here the spring 13 is transferred entirely into its position belonging to the normal state according to FIG. 1. As a result, the spring 13 ensures that the mass inertia lever 9, 10 releases the coupling element 8 at the end of the first stroke with respect to its previously assumed engaged position. In fact, the spring 13, in conjunction with the mass inertia lever 9, 10, ensures that the actuating element 9 moves away from the coupling element 8 so that the latter can move spring-assisted into the engaged position according to FIG. 1. Now, a second stroke of the actuating lever 4, 5, 6 causes the locking mechanism 1, 2 to be opened as described.

In fact, a second stroke of the outer actuating lever 5 causes the coupling element 8 to swivel clockwise from the normal state shown in FIG. 1, thereby allowing the release lever 7 to lift the pawl 2 from its engagement with the rotary latch 1. The same applies to the inner actuating lever 6, whose indicated downward movement also swivels the coupling element 8 clockwise during the second stroke with the same described consequences.

LIST OF REFERENCE SIGNS

1 Rotary latch
2 Pawl
3 Lock case
4 Main actuating lever
4*a* Inertia arm
4*b* Actuating arm
5 Outer actuating lever
6 Inner actuating lever
7 Release lever
8 Coupling element
9 Actuating element
10 Mass element
11 Locking lever
12 Axis
13 Spring
13*a*, 13*b* Contact tongue
14 Stop
15 Guide opening
16 Axis
17 Guide contour
18 Stop

The invention claimed is:

1. A motor vehicle lock comprising:

a locking mechanism including a rotary latch and a pawl, at least one actuating lever and a release lever, a coupling element for engaging the actuating lever with the release lever from a disengaged position to an engaged position, and at least one mass inertia lever for forcing the coupling element into the disengaged position at least in event of a crash, wherein the actuating lever is subjected to a 2-stroke actuation during or after the crash for opening the locking mechanism.

2. The motor vehicle lock according to claim 1, wherein the actuating lever acts in a first stroke of the 2-stroke actuation on a spring acting on the mass inertia lever to permit movement of the coupling element to the engaged position, and in a second stroke of the 2-stroke actuation the actuating lever acts on the release lever engaged via the coupling element to open the locking mechanism.

3. The motor vehicle lock according to claim 2, wherein the spring engages with a contact tongue in a guide opening of the mass inertia lever.

4. The motor vehicle lock according to claim 3, wherein the contact tongue occupies either of two positions within the guide opening including a rest position and a crash position.

5. The motor vehicle lock according to claim 4, wherein the actuating lever comprises a main actuating lever, as an inner actuating lever and/or an outer actuating lever.

6. The motor vehicle lock according to claim 5, wherein the main actuating lever and the inner actuating lever and/or outer actuating lever are mounted on a same axis.

7. The motor vehicle lock according to claim 5, wherein the main actuating lever is a two-arm lever comprising an inertia arm that act interacts with the mass inertia lever and an actuating arm that interacts with the inner actuating lever.

8. The motor vehicle lock according to claim 7, wherein the inertia arm has a guide contour for the contact tongue of the spring.

9. The motor vehicle lock according to claim 5, wherein the outer actuating lever has a stop for interacting with a counter stop on the main actuating lever.

10. The motor vehicle lock according to claim 7, wherein the inner actuating lever acts on the actuating arm of the main actuating lever during actuation.

11. The motor vehicle lock according to claim 1, wherein the coupling element is mounted linearly displaceable on the release lever and displaced in a longitudinal direction between the engaged position and the disengaged position.

12. The motor vehicle lock according to claim 1, wherein the mass inertia lever comprises a mass element and a control element articulated to the mass element, wherein the control element acts against the coupling element to move the coupling element from the engaged position to the disengaged position.

* * * * *